United States Patent
Messenger (10) Patent No.: US 7,166,027 B2
(45) Date of Patent: Jan. 23, 2007

(54) MOG REMOVER

(76) Inventor: Scott Messenger, P.O. Box 211, Pencla, South Australia 5277 (AU)

( * ) Notice: Subject to any disclaimer, the term of this patent is extended or adjusted under 35 U.S.C. 154(b) by 0 days.

(21) Appl. No.: 10/908,844

(22) Filed: May 27, 2005

(65) Prior Publication Data

US 2006/0270474 A1    Nov. 30, 2006

(51) Int. Cl.
*A01D 17/02* (2006.01)
*A01F 12/46* (2006.01)

(52) U.S. Cl. .................................... 460/114

(58) Field of Classification Search ............... 460/134, 460/114, 115, 123, 124, 132, 140, 144, 145, 460/146–148; 56/327.1; 209/421; 198/301
See application file for complete search history.

(56) References Cited

U.S. PATENT DOCUMENTS

| | | | | |
|---|---|---|---|---|
| 3,437,151 A | * | 4/1969 | Button ....................... | 171/17 |
| 3,754,382 A | * | 8/1973 | Rakestraw ................. | 56/27.5 |
| 4,141,200 A | * | 2/1979 | Johnson .................... | 56/10.2 E |
| 4,147,017 A | * | 4/1979 | Cortopassi et al. .......... | 56/16.5 |
| 4,157,005 A | * | 6/1979 | Orlando et al. ............... | 56/228 |
| 4,261,163 A | * | 4/1981 | Shaw ........................ | 56/327.1 |
| 4,519,191 A | * | 5/1985 | Ledebuhr et al. ............. | 56/331 |
| 5,846,129 A | * | 12/1998 | Dragt ........................ | 460/144 |
| 5,865,675 A | * | 2/1999 | Meester ..................... | 460/114 |

* cited by examiner

*Primary Examiner*—Árpád Fábián Kovács
(74) *Attorney, Agent, or Firm*—Weiner & Burt, P.C.; Irving M. Weiner; Pamela S. Burt (57) ABSTRACT

The present invention relates to an apparatus for the separation of fruit from other plant matter. In particular, the present invention relates to an apparatus for the separation of Material Other than Grapes (MOG) from viable berries during the harvesting of wine grapes. The improved MOG remover is able to be used in conjunction with conventional harvesting machinery and ensures that the harvested material is in contact with a separation conveyer for a long enough period of time to result in the full separation of the berries from the MOG. The separation conveyer is able to be adjusted to compensate for variations in terrain and the degree of difficulty of separating the berries from bunches. This ensures that the apparatus 10 is able to function effectively whilst the loss of viable berries is minimised.

9 Claims, 8 Drawing Sheets

MOG REMOVER

BACKGROUND OF THE INVENTION

The quality of wine is not only dependent on the characteristics of the wine grapes and there are many other factors that directly influence the character of wine produced. One of the most significant problems during the harvesting process is the collection of material other than grapes along with the actual berries. This material, often referred to as MOG, includes stems, canes and leaves. Stem tannins are quite different from skin tannins and can result in wine with unwanted astringency.

It is well known in the wine industry that MOG can result in a reduction in body and volume of the wine and increase perception of rough tannins, harsh astringency and bitterness. For this reason wineries require fruit free of MOG before it can be placed in the fermenting tanks. Furthermore, many large wineries stipulate in their processing agreements with smaller wineries that they can reject fruit that is in their opinion unsuitable for processing or is contaminated by MOG.

Consequently, sorting tables have been used by wineries to manually remove the MOG. Sorting tables in the past were a simple rectangular horizontal table that accommodated around six people who manually remove the MOG. The tables were not designed for a high crush rate and significantly slowed the harvesting process. However, the tables gave winemakers more control over the quality of grapes placed in the fermentation tanks by eliminating unwanted MOG.

Most large wineries now have sophisticated systems of sorting tables. These tables are usually associated with a destemmer and are tilted at an incline so that the fruit moves slowly toward the hopper. Most manufacturers make tables to accommodate 8 to 12 people, however, some systems are known to accommodate over 20 people. As the reader will appreciate this process is very labour-intensive which results in increased cost of production. This makes many of these systems not commercially viable for smaller wineries.

Despite the costs associated with the removal of MOG, one of the latest trends in winemaking is putting more resources in sorting grapes. Mainstream premium producers are becoming more interested in sorting systems to increase their quality of wine. Likewise, wineries in the lower end of the premium segment of the wine industry are beginning to use procedures once only used by ultra-premium producers.

Systems that are attached to mechanical harvesters have been developed to remove MOG during the harvesting process. These systems incorporate a series of conveyers that separate the berries from the MOG. As the harvested material passes along an inclined separation conveyer the berries are separated from the MOG. The berries are then transported to the hopper and the MOG is deposited back onto the ground as mulch. The difficulty with this system is that it can not account for different operating conditions and different grape varieties. If the harvested material is not allowed to remain on the separation conveyer for a sufficient period of time the berries may be deposited onto the ground along with the MOG. On the other hand, if the harvested material remains on the separation conveyer for an extended period blockage may occur. This is particularly relevant on undulating ground or where grape varieties that typically grow in tight clusters are being harvested. Other factors that influence the degree of difficulty of separating the grape berries from the MOG are the size of the grapes and the time at which the grapes are harvested, for instance for the production of chardonnay the grapes are picked green.

It is an object of the present invention to provide for a MOG remover that overcomes at least some of the aforementioned problems or provides the public with a useful alternative.

It is a further object of the present invention to provide for a MOG remover used with fruit harvesters, such as a grape harvester, that can accommodate different operating conditions.

SUMMARY OF THE INVENTION

Therefore in one form of the invention there is proposed an apparatus for the separation of fruit from other plant matter, including:

a first conveyer adapted to transport said fruit and other plant matter;

a separation conveyer including a means to separate fruit from said other plant matter;

whereby the angle of said separation conveyer, with respect to said first conveyer, is able to be adjusted.

By adjusting the angle of the separation conveyer the time that the fruit and other plant matter remains in contact with the separation conveyer is adjusted. As the angle, from horizontal, is increased the fruit and other plant matter remain in contact with the separation conveyer for a longer period of time. This is important where the fruit is difficult to separate, for instance, where small green berries are being separated from stalks.

Preferably, said angle of said separation conveyer is able to be adjusted independent of said first conveyer.

Preferably, said angle of said separation conveyer is able to be adjusted in a range between 18°–36°.

Preferably, said angle of said separation conveyer is adjusted by means of a hydraulic cylinder.

Preferably, said angle of said separation conveyer can be adjusted during operation of said apparatus.

Preferably, said apparatus includes sensors that measure the angle from horizontal of said separation conveyer.

Preferably, said angle of said separation conveyer is measured and automatically adjusted during operation.

Preferably, said fruit is grape berries and said other plant matter is leaves, stem and canes.

Preferably, said separation conveyer includes a series of rollers, each said roller having a plurality of spaced apart discs which include flexible projections.

Preferably, said rollers are powered by means of a hydraulic motor.

Preferably, the spaces between said discs allow the passage of said fruit without permitting the passage of said other plant matter.

In a further form of the invention there is proposed an apparatus for the separation of fruit from other plant matter, including:

a first conveyer adapted to transport said fruit and other plant matter;

a separation conveyer adapted to separate fruit from said other plant matter; and a discharge device adapted to remove said other plant matter from said apparatus.

Preferably, said discharge device is an exit conveyer adapted to eject said other plant matter from said apparatus.

Preferably, said apparatus can be used in conjunction with conventional harvesting equipment.

BRIEF DESCRIPTION OF THE DRAWINGS

The accompanying drawings, which are incorporated in and constitute a part of this specification and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The following description will describe a preferred embodiment of the invention when used to separate harvested grapes from Material Other than Grapes (MOG). However, it is to be understood that the present invention may equally well be employed to separate not only other fruits from stems and the like, but also materials of different dimensions. The reader should therefore be aware that although the following description is limited to the separation of grapes from MOG it is not meant to limit the invention to this application.

Figure 1:
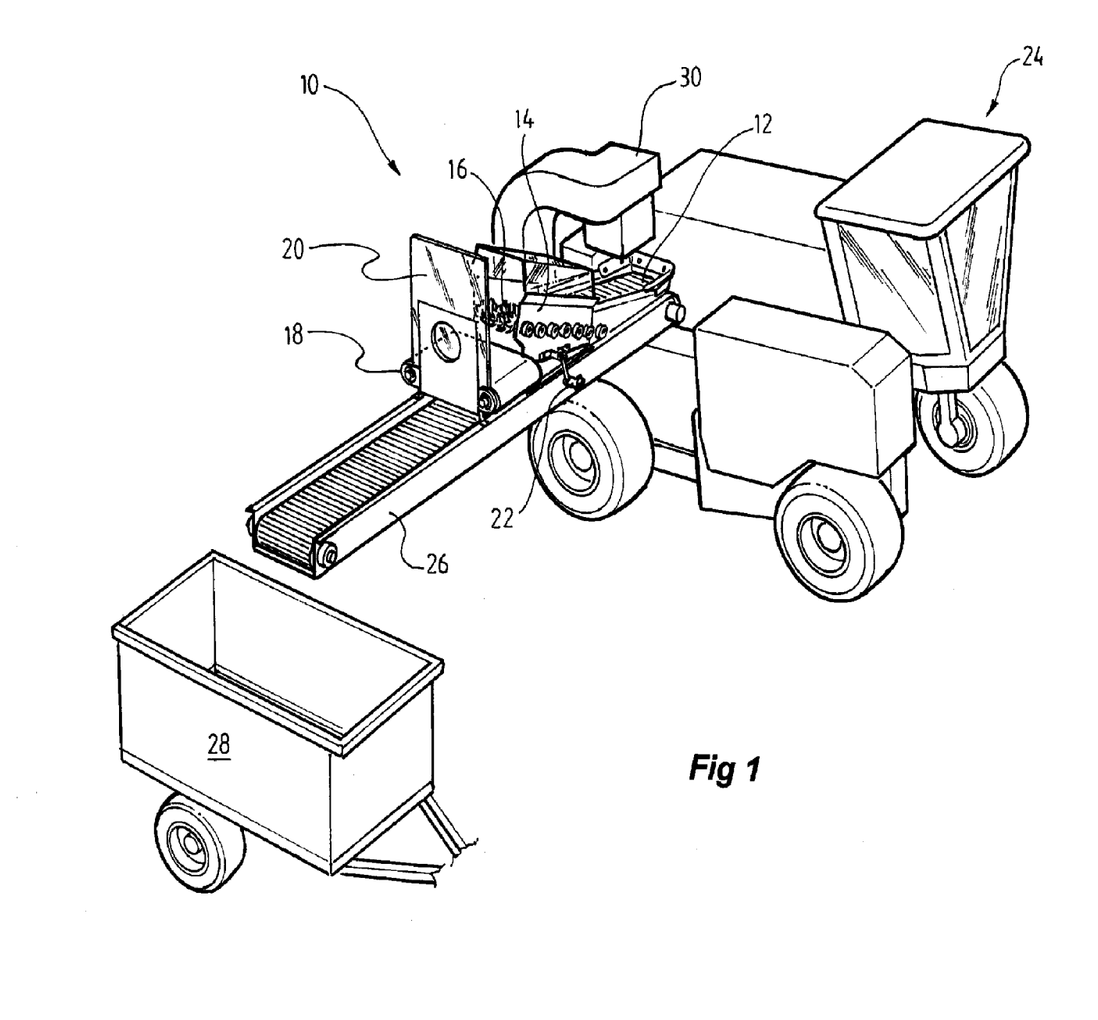
FIG. 1 is a perspective view of an improved MOG remover attached to a grape harvesting system.

Illustrated in FIG. 1 is an apparatus 10 for separating berries from material other than grapes during the harvesting process. The apparatus 10 includes a first conveyer element 12, an adjustable separation conveyer element 14 made up of a series of rotating projections or arms 16, an exit conveyer element 18 and a shield 20. The apparatus 10 has an adjustment device 22 which is able to adjust the angle, with respect to the horizontal plane, of the separation conveyer element 14 in a range typically between 18°–36°. The reader should however appreciate that the invention is not limited to this particular range or angles. The apparatus 10 is used in conjunction with a grape harvester 24 and is mounted onto a conventional conveyer 26 by way of bolts or welds as is well known in the art. Existing conveyers 26 are between three to five meters long and transport the harvested material from the harvester 24 to a hopper or trailer 28. Apparatus 10 is mounted on the conveyer 26 below the opening of outlet duct 30 that is the outlet from the grape harvester where the harvested material is fed from.

The harvested material which includes grapes, leaves, canes and stems is conveyed through the grape harvester 24 and into the outlet duct 30. The harvested material is then deposited onto the apparatus 10 and the grape berries are separated from the MOG. The grape berries are then transported to the hopper 28 by way of the conveyer 26. The MOG is transferred onto the exit conveyer 18 and is dropped onto the ground.

Figure 2:
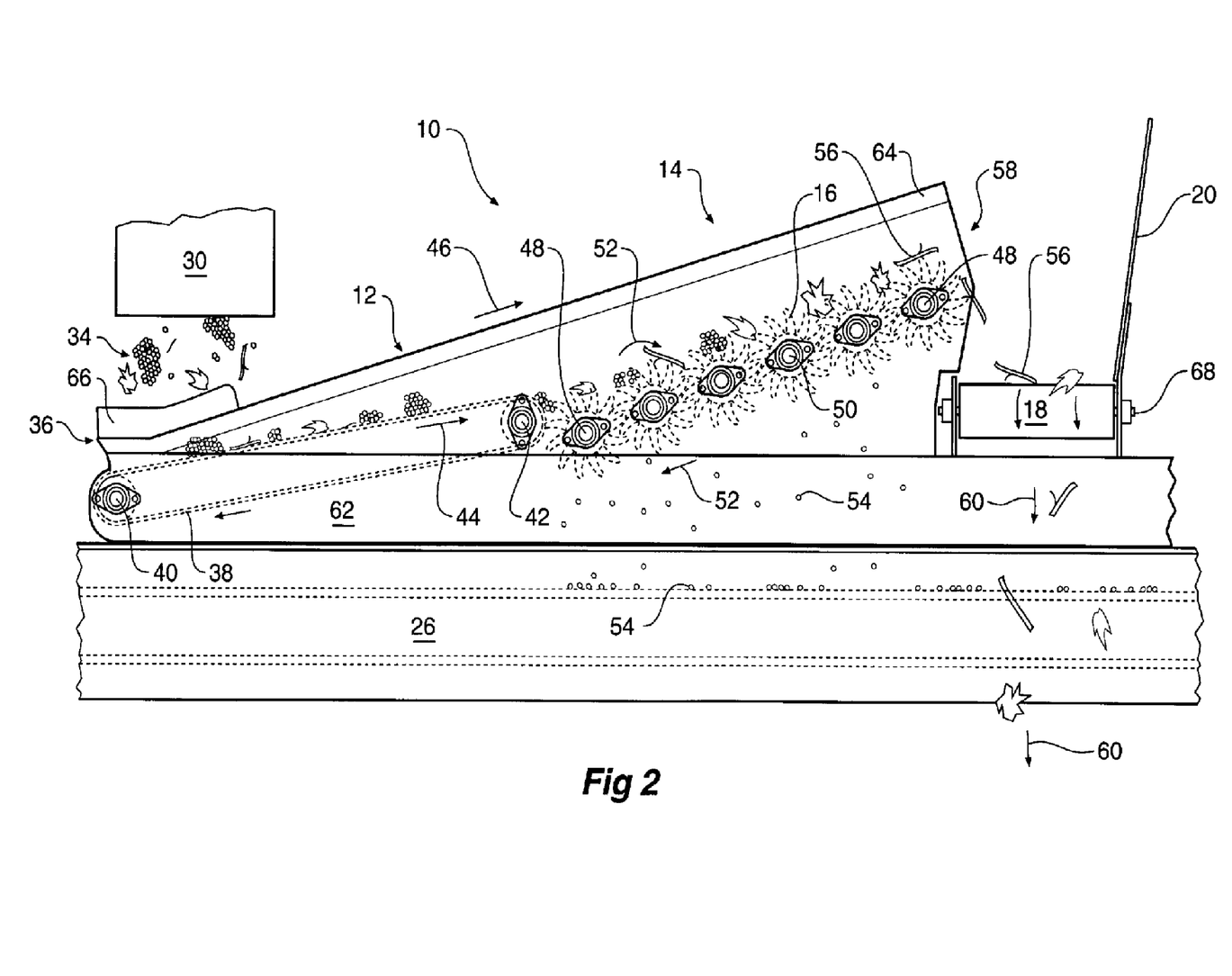
FIG. 2 is a side view of the prior art.

The general principles of the system are illustrated in FIG. 2. During operation the harvested material 34, which emanates from the outlet duct 30, drops onto the first conveyer element 12 at the rear 36 of the apparatus 10. The first conveyer element 12, in the form of a belt 38, is mounted on two opposing rollers 40 and 42. The first conveyer element 12 is typically powered by a conventional motor such as well-known hydraulic motors used in the industry. The belt 38 rotates in the direction of the arrows 44 thereby transporting the harvested material 34 forwardly and upwardly in the direction of arrow 46. The harvested material 34 is then delivered to the separation conveyer 14 which comprises a series of rollers 48. Each roller 48 includes a plurality of spaced apart discs 50 having a plurality of flexible projectiions or arms 16. The rollers 48 rotate in the direction of arrows 52 and are powered by a conventional motor.

Figure 3:
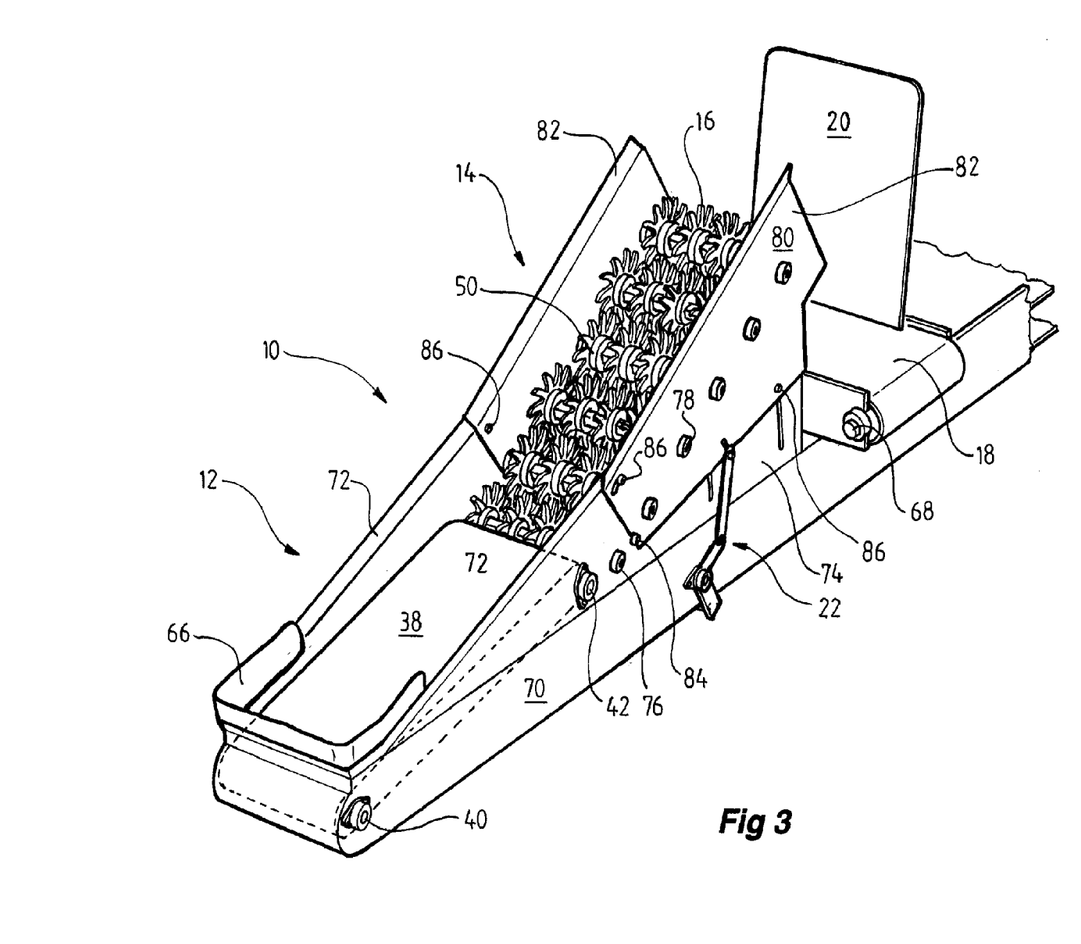
FIG. 3 is a perspective view of the improved MOG remover of FIG. 1.

The harvested material 34 is moved forwardly and upwardly in the direction of arrow 46. The rollers 48 rotate at a speed of up to several hundred revolutions per minute. The projections 16 are bent backwards to the direction of rotation, as illustrated in FIG. 3. The action of the rotating flexible projections 16 results in the berries 54 being separated from the stems and other MOG 56. The separated berries 54 are then able to fall between the spaced apart discs 50 and drop onto the conveyer 26. The MOG 56, which is too large to pass between the discs 50, is conveyed up over the end 58 of the last roller 48 and drops onto the exit conveyer 18. This exit conveyer 18 ensures that the MOG 56 is removed from the apparatus 10 in the direction of arrow 60 and deposited onto the ground away from the harvested grape berries 54.

Both first and second conveyer elements 12 and 14 are supported within a frame 62 that includes upwardly projecting sides 64. These sides 64 ensure that the harvested material does not prematurely exit the apparatus 10 during operation. The frame 62 further includes a rear shield 66, to ensure that harvested material being transmitted from the outlet duct 30 of the harvester 24 is not lost, and a forward shield 20. The forward shield 20 ensures that the MOG 56 is not thrown over the exit conveyer 18 during operation and onto conveyer 26 containing the separated berries 54. As the reader would appreciate, remixing of the MOG 56 with the separated berries 54 would effectively nullify the work performed by the separation conveyer 14. The exit conveyer belt 18 is mounted on rollers 68. However, it should be appreciated that the exit conveyer 18 may simply be a piece of stainless steel set on an angle which facilitates the ejection of the MOG 56 from apparatus 10.

The above apparatus will only function at it peak performance if the harvested material 34 is influenced by the separation conveyer 14 for a sufficient period of time for the berries 54 to separate from the MOG 56. If the harvested material 34 is not influenced by the separation conveyer 14 for a long enough period of time the berries 54 may be deposited onto the ground along with the MOG 56. In contrast, if the harvested material 34 remains on the separation conveyer 14 for too long then the first and second conveyer elements 12 and 14 may become blocked or may not operate effectively.

Variation in the time that the harvested material 34 spends on the separation conveyer 14 is dependent on the angle of the separation conveyer 14. As the reader would appreciate, the greater the angle, the more time the harvested material 34 will spend in contact with the separation conveyer 14. Because the apparatus 10 is mounted onto an existing conveyer 26, the angle of the separation conveyer 14 is affected by the angle of conveyer 26. This is not a problem where the ground is flat and the conveyer 26 is in a substantially horizontal position. However, where the ground is undulating or where the vineyard is located on the side of a hill it is difficult, if not impossible, to have the conveyer 26 extending horizontally. The most effective angle of the separation conveyer 14 also depends on different varieties of grapes. Some grapes varieties require more time on the separation conveyer 14 to separate the grapes 54 from the MOG 56. This is particularly relevant where the grape variety has small berries held in tight bunches or where the berries are picked green, such as in the harvesting of grapes for the production of chardonnay.

To overcome this limitations the angle of the separation conveyer 14 of the present apparatus 10 is able to be adjusted independent of the first conveyer element 12. Rollers 40 and 42 and the belt 38 of the first conveyer element 12 are supported within a frame 70 that includes upwardly projecting sides 72 and forwardly projecting plates 74. The first roller 76 of the separation conveyer 14 is attached to frame 70 whilst the subsequent rollers 78 are all supported within frame 80. The reader should appreciate that although five rollers 78 are illustrated in the Figures as being attached to frame 80 the present invention is not limited to this configuration. It may be desirable to have more or less rollers associated with frame 80. Furthermore, it may be desirable to have all rollers 76 and 78 associated with frame 80 rather than as illustrated in the Figures.

Frame 80 includes upwardly projecting sides 82 and is secured to frame 70 by way of a hinge pivot arrangement 84 on either side of frame 80. In this way, frame 80 is able to pivot around hinges 84 in the vertical plane. Apparatus 10 includes a series of locating bolt and slot arrangements 86, as is well known in the art. The arrangements 86 facilitate the adjustment of the angle of the separation conveyer 14 in the range between 18°–36°, whilst providing support. By appropriately selecting the angle of the separation conveyer 14, the harvested material 34 remains on the separation conveyer 14 for a sufficient period of time to ensure full separation of the berries 54 from the MOG 56 without causing a blockage or loss of viable fruit.

Figure 4:
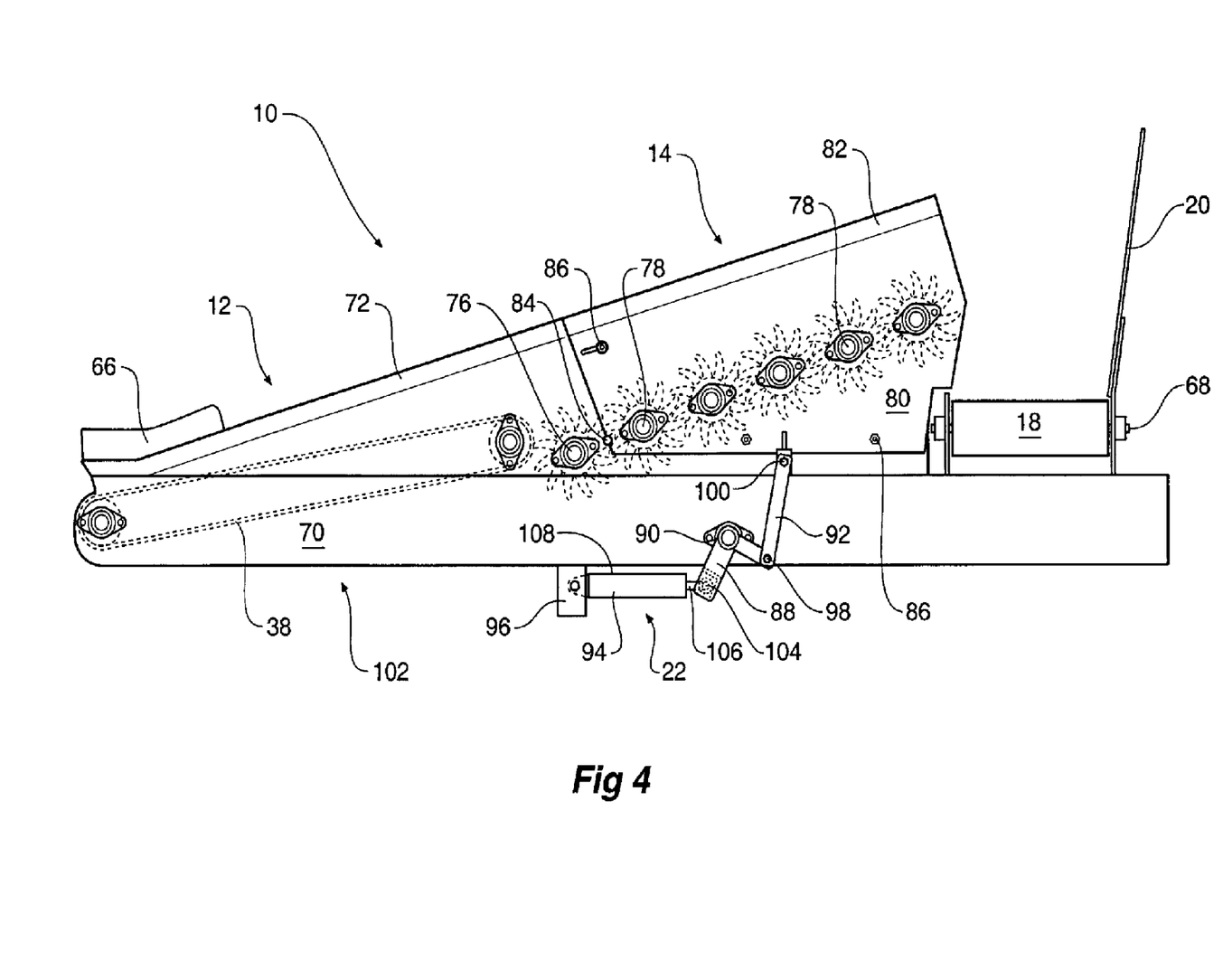
FIG. 4 is a side view of the improved MOG remover of FIG. 1 illustrating the separation conveyer element at approximately 18°.

The position of frame 80 and hence the angle of the separation conveyer 14 is adjusted by adjustment device 22, as illustrated in FIG. 4. The adjustment device 22 includes an L-shaped member 88 pivotably mounted to the frame 70 by mounting device 90, a pivotable connector arm 92 and a hydraulic ram 94 mounted to support bracket 96. One end 98 of the connector arm 92 is pivotably mounted to the L-shaped member 88 whilst the opposite end 100 is pivotably mounted to frame 80. It is envisaged that a hydraulic ram 94 powered by a conventional motor would be used in the apparatus 10, however, the reader should appreciate the invention is not limited to the use of this type of operating system.

As further illustrated in FIG. 4, the hydraulic ram 94 is attached to the underside 102 of frame 70. Two L-shaped members 88 are mounted on either side of frame 70 and pivotably attached to frame 80 by pivotable connector arms 92. The two L-shaped members 88 are coupled to the hydraulic ram 94 by crossbeam 104.

Figure 5:
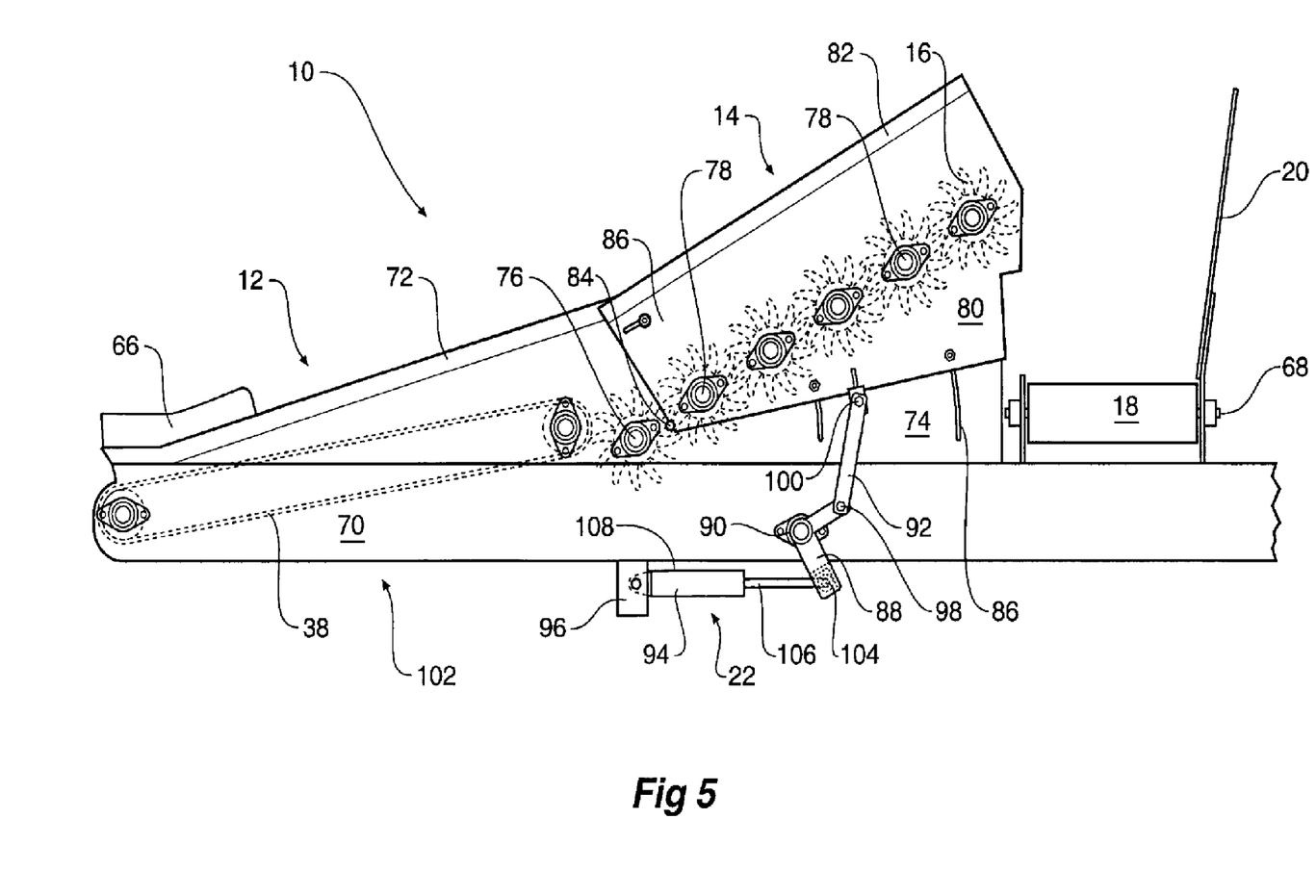
FIG. 5 is a side view of the improved MOG remover of FIG. 1 illustrating the separation conveyer element at approximately 36°.

When the piston 106 of the hydraulic ram 94 is in a retracted position, as illustrated in FIG. 4, the angle of the separation conveyer 14 is around 18°. As the piston 106 is forced out of the piston housing 108 the L-shaped member 88 is rotated around pivot point 90. This drives the connector arm 92 vertically which inturn increases the angle of the separation conveyer 14 as illustrated in FIG. 5. It is envisaged that the angle of the separation conveyer 14 would be able to be controlled by the operator from within the cabin of the harvester 24. It may also be desirable to have an automatic adjustment device that ensures the separation conveyer 14 remains at a particular angle from horizontal irrespective of terrain or the angle of conveyer 26. The apparatus may further include sensors attached to a motor which measure the angle of the separation conveyer 14 and makes appropriate adjustments to ensure a constant angle to the horizontal.

Figure 6:
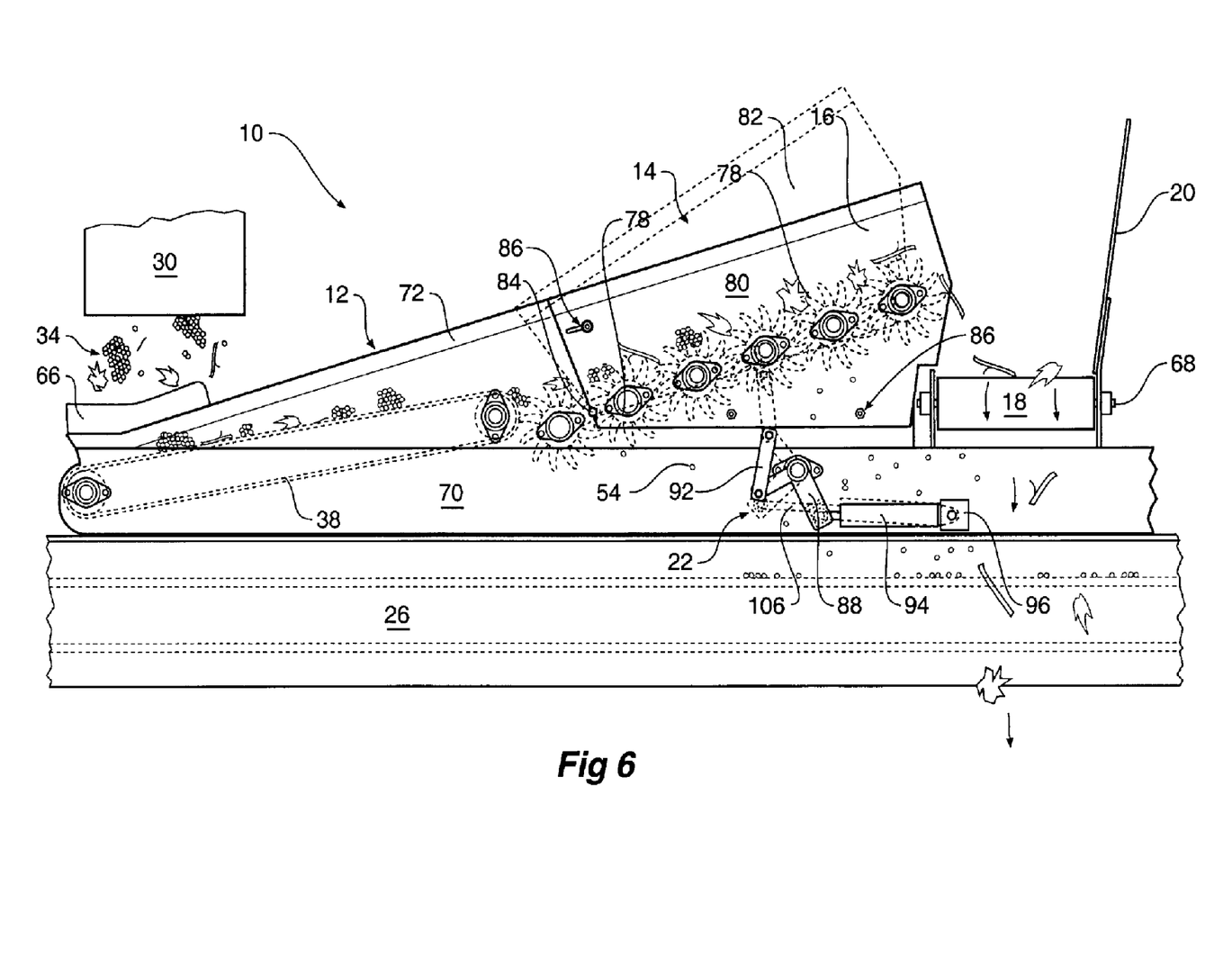
FIG. 6 is a side view of a second embodiment of an improved MOG remover.

In an alternate embodiment, as illustrated in FIG. 6, the hydraulic ram 94 can be mounted to the side of frame 70. Two cooperatively operated pistons 94 can be mounted on either side of the frame 70 to alter the angle of the separation conveyer 14. Alternatively, a single piston 94 can be mounted on one side and a pivotable support arm (not shown) can be mounted on the other side.

Figure 7:
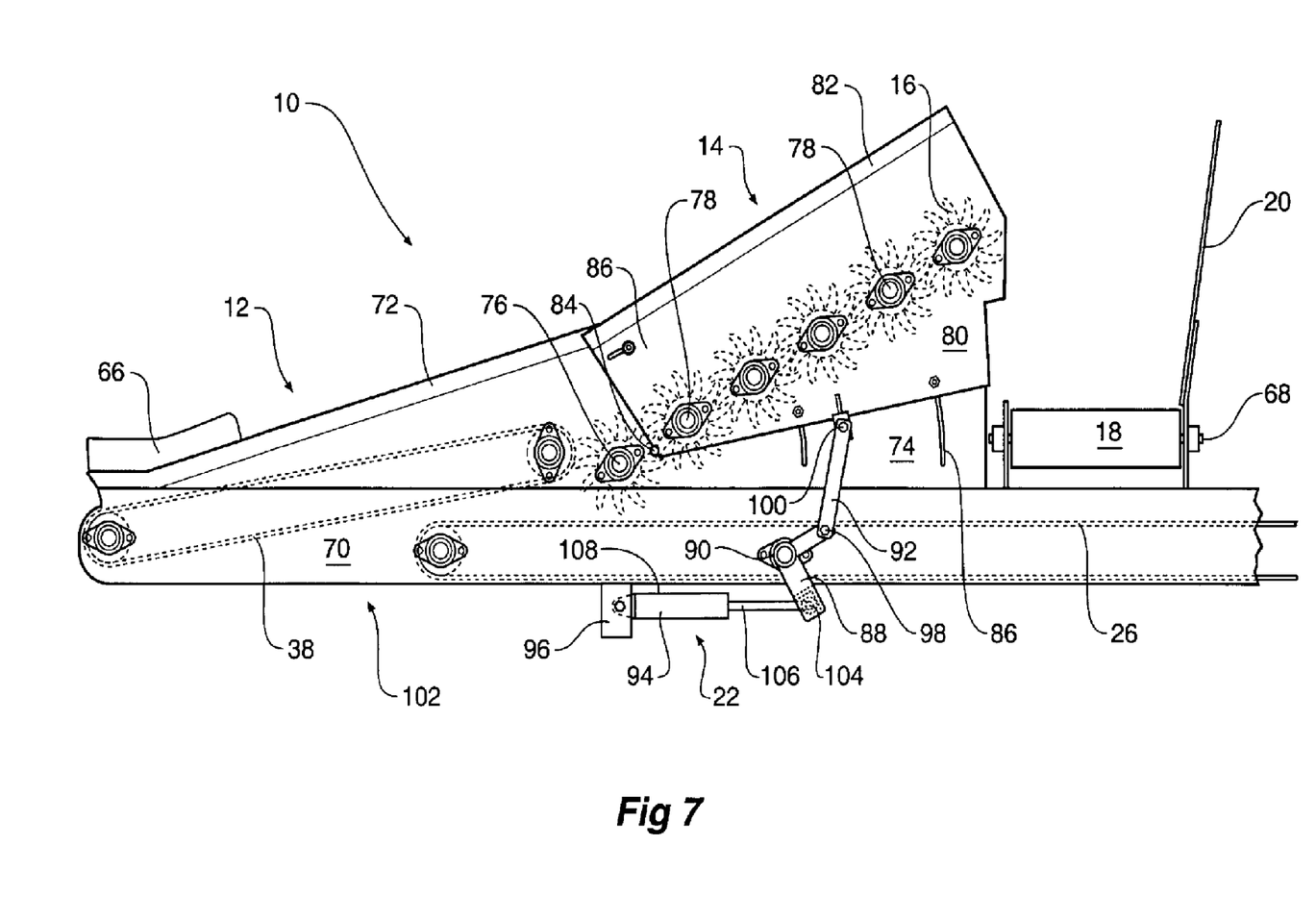
FIG. 7 is a side view of a third embodiment of an improved MOG remover.

In yet a further alternate embodiment, as illustrated in FIG. 7, the conveyer 26 with associated rollers 110, which carries the separated grapes 54 to the hopper 28, may be incorporated into frame 70. Incorporation of all conveyer elements in one unit would reduce the overall bulk of the apparatus 10, however, the reader should appreciate that this is only an alternate embodiment and the invention is not limited to the incorporation of all conveyer elements into one unit.

Figure 8:
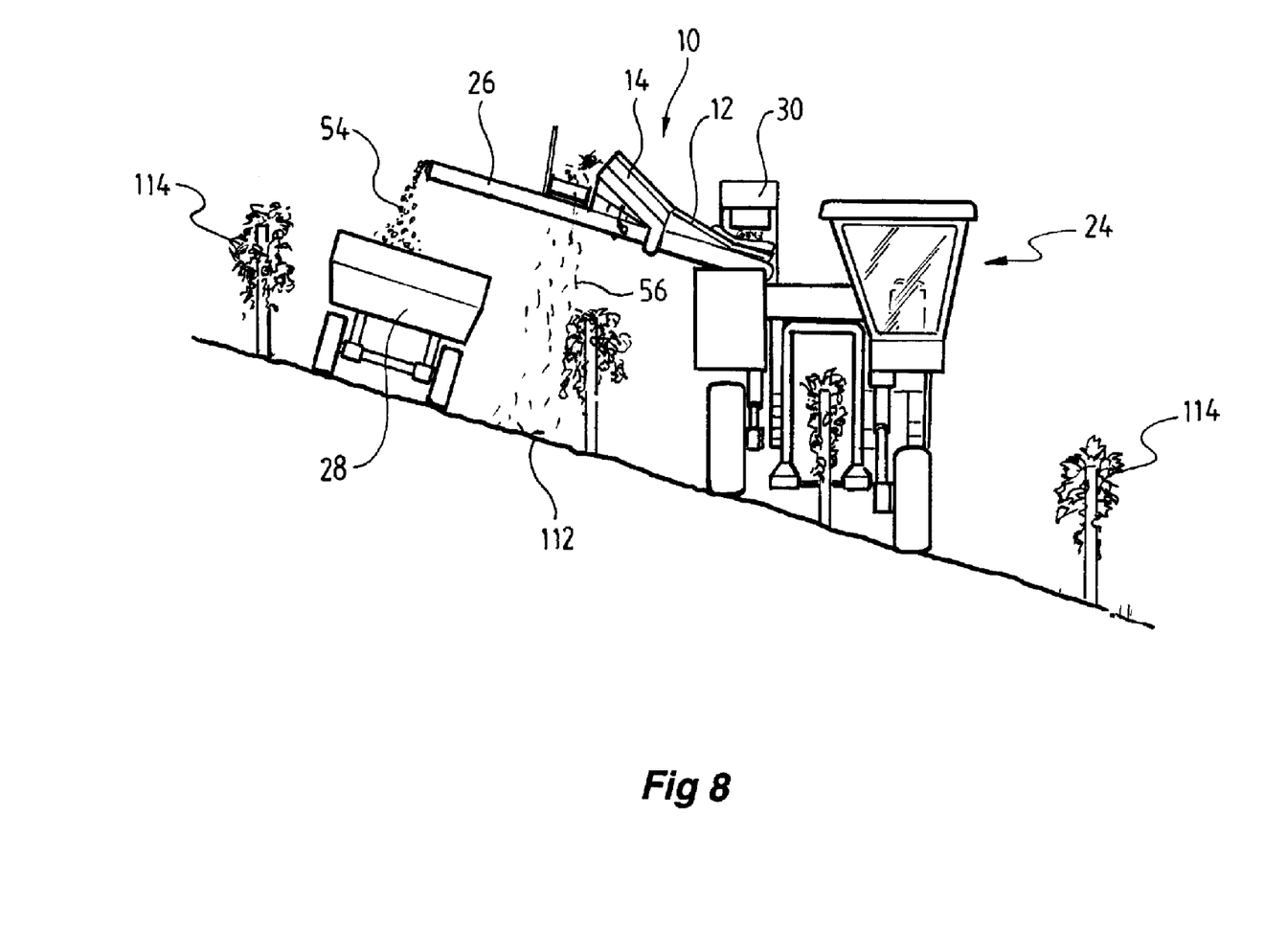
FIG. 8 is a front view of a harvesting system including an improved MOG remover operating on sloping ground.

As illustrated in FIG. 8, many conventional grape harvesters 24 are tailored to be used on sloping ground 112, for example, where rows of vines 114 are planted on a hillside. When the harvester 24 is used under these conditions the conveyer 26 will be located in a plane that is not horizontal because the hopper 28 will be located at a different altitude to the harvester 24. For example, as illustrated in FIG. 8, the hopper 28 is located higher up the hill from the harvester 24. The angle of the conveyer 26 means that if the apparatus 10 was not able to be adjusted the angle of the separation conveyer 14 would be too steep, resulting in the potential blockage of the apparatus 10. Alternatively, if the hopper 28 was located lower down the hill the angle of the separation conveyer 14 would not be steep enough therefore resulting in the loss of viable fruit 54 along with the MOG 56.

Although the present invention incorporates the use of a hydraulic adjustment device 22 it should be appreciated by the reader that the invention is not limited to the use of this type of system. The adjustment device 22 can be in the form of electric or pneumatic adjustment devices. Alternatively, the separation conveyer element 14 can be adjusted by way of cables or any other means for adjustment.

The skilled addressee will now appreciate the many advantages of the present invention. The apparatus 10 is able to be used in conjunction with conventional machinery which has significant cost saving benefits, since the producer is able to use their existing harvesting and conveyer systems. The MOG remover overcomes many of the problems associated with the operating conditions. The ability to adjust the separation conveyer element 14 allows the operator to modify the apparatus 10 during operation to compensate for variations in terrain and the degree of difficulty of separation of berries from bunches. This ensures that the apparatus 10 is able to function effectively whilst minimising the loss of viable berries.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

What is claimed is:

1. An apparatus for separating fruit from other plant matter, comprising:
   a first conveyer disposed at a first angle for transporting said fruit and other plant matter from an outlet duct of a fruit harvesting machine to a separation conveyer;
   said separation conveyer being disposed at a second angle and having separation means for separating said fruit from said other plant matter;
   fruit/other plant matter separation conveyer angle adjustment means at least a first portion of which is operably connected to said separation conveyer for adjusting said second angle relative to said first angle of said first conveyer; and
   said apparatus includes sensors which measure said second angle from horizontal of said separation conveyer.

2. An apparatus for separating fruit from other plant matter, comprising:
   a first conveyer disposed at a first angle for transporting said fruit and other plant matter from an outlet duct of a fruit harvesting machine to a separation conveyer;
   said separation conveyer being disposed at a second angle and having separation means for separating said fruit from said other plant matter;
   fruit/other plant matter separation conveyer angle adjustment means at least a first portion of which is operably connected to said separation conveyer for adjusting said second angle relative to said first angle of said first conveyer; and
   said separation conveyer includes spaces which allow the passage therethrough of said fruit without permitting the passage therethrough of said other plant matter.

3. An apparatus for separating fruit from other plant matter, comprising:
   a first conveyer disposed at a first angle for transporting said fruit and other plant matter from an outlet duct of a fruit harvesting machine to a separation conveyer;
   said separation conveyer being disposed at a second angle and having separation means for separating said fruit from said other plant matter;
   fruit/other plant matter separation conveyer angle adjustment means at least a first portion of which is operably connected to said separation conveyer for adjusting said second angle relative to said first angle of said first conveyer;
   a discharge device;
   said separation conveyer deposits said other plant matter onto said discharge device; and
   said discharge device removes said other plant matter from said apparatus.

4. An apparatus as in claim 3, wherein:
   said discharge device is an exit conveyer which ejects said other plant matter from said apparatus.

5. A fruit harvesting machine incorporating an apparatus for separating fruit from other plant matter comprising a first conveyer disposed at a first angle for transporting said fruit and other plant matter from an outlet duct of a fruit harvesting machine to a separation conveyer; said separation conveyer being disposed at a second angle and having separation means for separating said fruit from said other plant matter, and fruit/other plant matter separation conveyer angle adjustment means at least a first portion of which is operably connected to said separation conveyer for adjusting said second angle relative to said first angle of said first conveyer, including:
   fruit harvesting means for delivering harvested material to said outlet duct;
   said first conveyer transports said harvested material from said outlet duct to said separation conveyer which is adjustable;
   said adjustable separation conveyer separates said bit and said other plant matter from said harvested material; and
   said conveyer angle adjustment means adjusts the angle of said separation conveyer with respect to said first conveyer.

6. A fruit harvesting machine according to claim 5, wherein:
   said separation conveyer includes spaces which allow the passage therethrough of said fruit without permitting the passage therethrough of said other plant matter;
   there is provided a frame within which said first conveyer is supported;
   there is provided beneath said first conveyer and beneath said separation conveyer a fruit-carrying conveyer upon which fruit-carrying conveyer the fruit is deposited beneath said spaces in said separation conveyer; and
   said fruit-carrying conveyer is incorporated into said frame.

7. A fruit harvesting machine according to claim 5, wherein:
   said separation conveyer includes a series of rollers, each said roller having a plurality of spaced-apart discs which include flexible projections.

8. A fruit harvesting machine according to claim 6, wherein:
   said separation conveyer includes a series of rollers, each said roller having a plurality of spaced-apart discs which include flexible projections.

9. A fruit harvesting machine according to claim 7, wherein:
   there is provided a pivotable separation conveyer frame which supports at least some of said rollers of said separation conveyer; and
   said conveyer angle adjustment means has a first portion connected to said pivotable separation conveyer frame, and a second portion thereof connected to said first conveyer fame for adjusting said angle of said separation conveyer with respect to said first conveyer.

* * * * *